United States Patent
Ishigure

(10) Patent No.: US 7,861,889 B2
(45) Date of Patent: Jan. 4, 2011

(54) THIN-PART FEEDING DEVICE

(75) Inventor: Kanji Ishigure, Gifu (JP)

(73) Assignee: Asahi Seiki Co., Ltd., Gifu (JP)

( * ) Notice: Subject to any disclaimer, the term of this patent is extended or adjusted under 35 U.S.C. 154(b) by 1054 days.

(21) Appl. No.: 11/326,767

(22) Filed: Jan. 6, 2006

(65) Prior Publication Data

US 2006/0196153 A1    Sep. 7, 2006

Related U.S. Application Data

(63) Continuation-in-part of application No. PCT/JP2004/009565, filed on Jul. 6, 2004.

(30) Foreign Application Priority Data

| Jul. 8, 2003 | (JP) | ............................. 2003-193415 |
| Aug. 29, 2003 | (JP) | ............................. 2003-307199 |
| May 26, 2004 | (JP) | ............................. 2004-156882 |

(51) Int. Cl.
*B65H 3/08* (2006.01)
*B65H 9/00* (2006.01)
*B23Q 7/12* (2006.01)
*B65G 47/24* (2006.01)

(52) U.S. Cl. ...................... 221/278; 221/174; 221/253; 221/171; 221/200; 221/236; 221/223; 221/157; 221/268; 221/168; 221/172; 221/198; 198/393; 198/396; 198/394

(58) Field of Classification Search ................. 221/278, 221/174, 253, 171, 200, 236, 223, 157, 268, 221/168, 172, 198; 198/393, 396, 394
See application file for complete search history.

(56) References Cited

U.S. PATENT DOCUMENTS

| 3,680,736 A | * | 8/1972 | Viessmann | .................... 221/14 |
| 4,051,900 A | * | 10/1977 | Hankins | ................... 166/280.2 |
| 4,960,195 A | * | 10/1990 | Yamaguchi et al. | ........... 193/44 |
| 5,161,473 A | * | 11/1992 | Landphair et al. | ........... 111/176 |
| 5,385,434 A | * | 1/1995 | Quinn et al. | ................... 406/73 |
| 5,400,016 A | * | 3/1995 | Aoyama | ..................... 340/674 |

(Continued)

FOREIGN PATENT DOCUMENTS

JP     56-082716     7/1981

(Continued)

*Primary Examiner*—Gene O. Crawford
*Assistant Examiner*—Rakesh Kumar
(74) *Attorney, Agent, or Firm*—Black Lowe & Graham PLLC

(57) ABSTRACT

A thin-part feeding device is provided which is compact and efficient. The device has a funnel portion with a feeding opening at the bottom thereof, a take-out tube for taking out thin parts from the funnel portion, and a receiving portion with separate opening for receiving thin parts from the discharge opening. The receiving portion is movable, and the receiving opening is sized to receive only one thin part. The device is operative to repeat a state where the receiving opening faces the discharge opening, and a state where the receiving opening is away from the discharge opening to enable thin parts to be taken out from the receiving opening. The device also features a novel, posture-correcting portion to correct vertical posture of thin parts, a delivery portion for receiving posture-corrected thin parts, and a transporting portion as described.

3 Claims, 12 Drawing Sheets

U.S. PATENT DOCUMENTS

| | | | | |
|---|---|---|---|---|
| 6,098,838 A | * | 8/2000 | Saho et al. | 221/163 |
| 6,161,676 A | * | 12/2000 | Takahashi et al. | 198/396 |
| 6,283,272 B1 | * | 9/2001 | Hsieh | 198/394 |
| 6,283,325 B1 | * | 9/2001 | Saito et al. | 221/200 |
| 6,386,433 B1 | * | 5/2002 | Razon et al. | 228/246 |
| 6,443,326 B1 | * | 9/2002 | Saito et al. | 221/163 |
| 6,634,545 B2 | * | 10/2003 | Razon et al. | 228/246 |
| 6,655,547 B2 | * | 12/2003 | Saito et al. | 221/156 |
| 6,997,341 B2 | * | 2/2006 | Pearson et al. | 221/7 |
| 7,051,900 B2 | * | 5/2006 | Reeves | 221/200 |
| 2007/0023445 A1 | * | 2/2007 | Vodonos | 221/174 |
| 2009/0071973 A1 | * | 3/2009 | Hester et al. | 221/190 |

FOREIGN PATENT DOCUMENTS

| | | | | |
|---|---|---|---|---|
| JP | 56082716 A | * | 7/1981 | |
| JP | 61-190200 | | 8/1986 | |
| JP | 02-019584 | | 1/1990 | |
| JP | 02-019586 | | 1/1990 | |
| JP | 03-043109 | | 2/1991 | |
| JP | 05-162849 | | 6/1993 | |
| JP | 05162849 A | * | 6/1993 | |
| JP | 05-338793 | | 12/1993 | |
| JP | 05338793 A | * | 12/1993 | |
| JP | 11-026986 | | 1/1999 | |
| JP | 11026986 A | * | 1/1999 | |

* cited by examiner (a)   (b)

(a)

(b)

(a)

(b)

(c)

(d)

(e)

(f)

(g)

Fig. 14
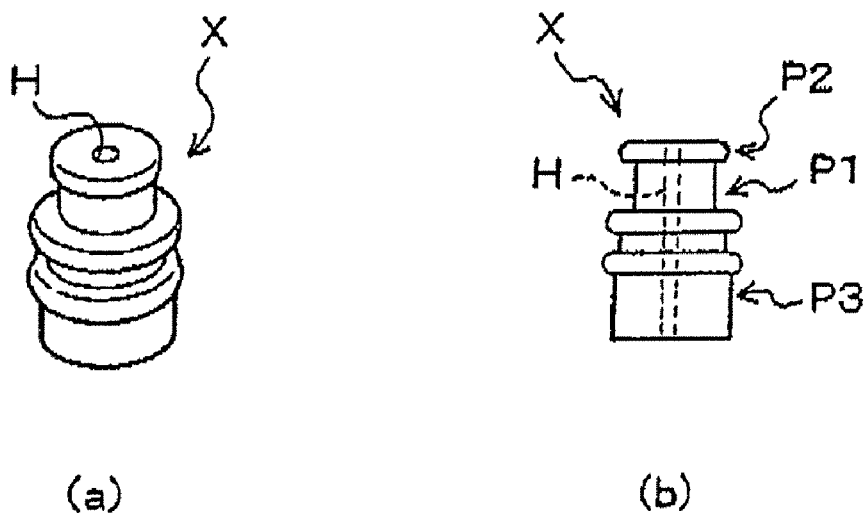
(a)　　　　　　　　(b)
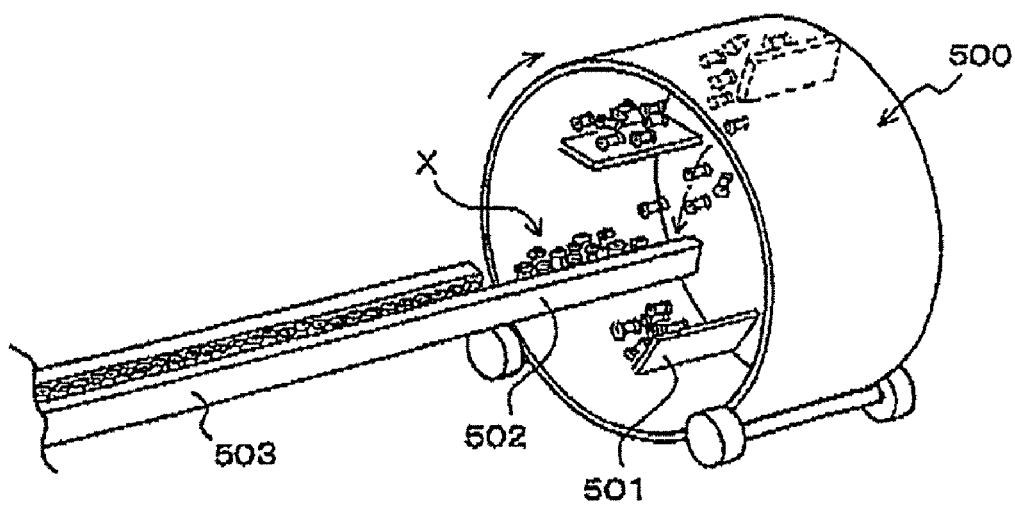
Fig. 15

THIN-PART FEEDING DEVICE

RELATED APPLICATIONS

This is a continuation-in-part application which claims priority benefit of Japanese Patent Application No. 2003-193415, filed Jul. 8, 2003; Japanese Patent Application No. 2003-307199, filed Aug. 29, 2003; Japanese Patent Application No. 2004-156882, filed May 26, 2004; and International Application Number PCT/JP2004/009565, filed Jul. 6, 2004, each of which priority disclosures is incorporated herein by reference.

TECHNICAL FIELD

The present invention relates to a thin-part feeding device that feeds thin parts to be used for steps of assembling objects including thin parts to the assembling step.

BACKGROUND OF THE INVENTION

Thin parts are, for example, waterproof rubber or the like to be waterproof stoppers of take-in openings for electric wires which are attached to terminals of electric wires and are provided to terminal housings. Mounting apparatuses that insert terminals of electric wires separately prepared by cutting out into the waterproof rubber so as to mount the waterproof rubber are prepared for such thin parts (waterproof rubber). The electric wires and the waterproof rubber as the thin parts are sequentially supplied to the mounting apparatuses, and a lot of electric wires which are inserted into the waterproof rubber are produced and are used for wiring works.

Waterproof rubber X as the thin part has various shapes according to thickness of electric wires and intended use. For example as shown in FIG. 14, the waterproof rubber X has an approximately cylindrical shape, and a hole H through which electric wires are inserted is pierced in the waterproof rubber X. A longitudinal center of the cylinder has a step portion P1, and both ends P2 and P3 have different thickness. A feeding device that takes out pieces of such waterproof rubber one by one so as to feed them is provided for the waterproof rubber, and thus, concretely the waterproof rubber is sequentially fed to the mounting apparatus for the electric wires, so that the electric wires are inserted into the waterproof rubber. Such thin parts include various ones having length of 7 mm and thickness of 5 mm and having length of 7 mm and thickness of 1.2 mm.

The conventional waterproof rubber feeding device is, for example as shown in FIG. 15, provided with a receiving portion 502 in a position where the waterproof rubber X, which is put into a rotating drum 500, is lifted by a blade portion 501 on a drum inner wall and then is dropped, can be received. A transporting device which is called as a feeder 503 which follows the receiving portion transports the waterproof rubber to a next step. The feeder 503 is the transporting device composed of a groove-shaped rail, and the waterproof rubber received by the groove of the rail is advanced by vibration so as to be fed.

In the above feeding device, excessive pieces of waterproof rubber are accumulated on the receiving portion, and thus the waterproof rubber is occasionally prevented from being fed to a next step. For this reason, there is Patent Document 1 (Japanese Patent Application Laid-Open No. 2003-20115) by the applicant of the present invention which is filed in order to solve this problem. According to this, since a quantity of the waterproof rubber which is fed to the receiving portion can be adjusted suitably, the effect that the receiving portion is not blocked up is obtained.

Further, in Patent Document 2 (Japanese Utility Model Laid-Open No. 02-8198), a chip part (thin part) which is fed from an air hopper drops onto a rail and enters a groove on the rail according to the part size. Excessively fed thin parts bump against the stopper and are collected to a parts pocket. The thin parts which enter the groove of the rail are adapted to be fed by applying slight vibration to the rail by means of a vibrator fixed under the rail.

In such a manner, the thin parts are received by the receiving portion and are transported to the feeder, but at this time the thin parts having the approximately cylindrical shape are stored in a groove of the feeder in an upright posture, and are transported sequentially. At this time, however, when the thin parts having top-bottom directional properties are fed to a next step, their vertical directions should be aligned. It is, therefore, necessary to remove thin parts whose direction is opposite to a desired direction from the feeder by means of a certain method and feed only thin parts which face the desired direction.

As mentioned above, in conventional methods, devices tend to be large because a space for dropping the thin parts onto the receiving portion is required, a space for again collecting thin parts which drop without being received by the receiving portion is required, or the thin parts should be lifted to a place where they are dropped. Further, when oil is applied to the thin parts (waterproof rubber), the feeding device is comparatively easily contaminated, and thus it should be suitably cleaned. It is, however, difficult to clean the conventional feeding devices due to their constitution. Further, when a difference in dimension between ends of the thin parts is small or discrimination between top and bottom portions is difficult, disadvantageously the thin parts are not fed due to their shapes. The thin parts (waterproof rubber) fed from the hopper to the feeder whose direction is opposite to a desired direction should be removed, and this is inefficient.

SUMMARY OF THE INVENTION

In view of the above problems, it is an object of the present invention to provide a thin-part feeding device that is downsized, easy to clean, and has excellent feeding efficiency.

In order to attain the above object, a thin-part feeding device comprises: a funnel portion that has a feeding opening at a bottom portion of a funnel and feeds thin parts; a take-out tube that is arranged with in the state that it is inserted into the feeding opening from below and takes out the thin parts from the funnel portion; and a receiving portion that has a receiving opening that receives the thin parts discharged from a discharge opening at a lower end of the take-out tube (claim 1).

The receiving portion is provided so as to be able to move in the state that an upper surface of the receiving portion covers the discharge opening, and the receiving opening is recessed on the upper surface so as to have a size for enabling only one thin part to be stored therein. As a result, the receiving opening is repeatedly brought into a state that it faces the discharge opening and a state that it deviates from the discharge opening so that the thin part can be taken out there from.

Accordingly, the thin parts can be introduced from the funnel portion to the take-out tube. The thin parts which drop off from the discharge opening of the take-out tube can be stored in the receiving opening of the receiving portion which faces the discharge opening, and when the receiving portion moves and the receiving opening deviates from the discharge opening, the thin parts can be taken out from the receiving opening. The thin parts can be, therefore, delivered to be fed from the receiving opening to a next step according to any method. As a result, the feeding device can be downsized. Concretely, an area for dropping the thin parts as explained in Background of the Invention is not necessary, and a mechanism that transports the thin parts upward and an operation area for the mechanism are not necessary for collecting the dropped thin parts or again feeding the collected thin parts. This feeding device can be used for the case where the top and bottom portions of the thin parts do not have to be discriminated.

The above thin-part feeding device comprises: a posture correcting portion that corrects a vertical posture of the thin parts; and a delivery portion that has a delivery opening for receiving the thin parts whose posture is corrected and delivers the thin parts to the outside of the device. Further, it comprises a transporting portion, so that the thin parts are transported from the receiving portion to the posture correcting portion and from the posture correcting portion to the delivery portion (claim 2).

As a result, when the thin parts have a vertical posture, the postures of the thin parts are aligned and then the thin parts can be delivered to the outside of the device.

The transporting portion has a transporting opening that sucks to house the thin parts and can eject to deliver them. Further, since the received thin parts are transported in the state that they are housed in the transporting opening and are delivered from another place, the thin parts can be transported from the receiving portion to the posture correcting portion and the posture correcting portion to the delivery portion (claim 3).

Further, when the thin parts have the vertical posture, a posture detecting unit that detects the vertical posture of the thin parts stored in the transporting opening may be provided (claim 4).

As one form of the posture detecting unit, when the thin parts have differences between top portions and bottom portions, the posture detecting unit detects a protruded state of the thin parts stored in the transporting opening so as to be capable of detecting the vertical posture (claim 5). The protruded state of the thin parts includes all states such that whether the thin parts are protruded from the transporting opening, or although the top portions or the bottom portions of thin parts are protruded, the shapes of the protruded portions are different, or a degree of the protrusion varies.

The posture correcting portion can correct the posture of the thin parts received from the transporting portion based on a post from the posture detecting unit (claim 6). As a concrete form of the posture correction, the posture correcting portion may be provided with a rotational moving opening that houses the thin parts and rotationally moves so as to reverse the vertical posture (claim 7).

Further, in the above thin-part feeding device, the thin parts may be sucked from an upper end opening of the take-out tube (claim 8). As a result, the thin parts can be sucked to be introduced into the take-out tube, and this is more efficient than the case where the thin parts are simply dropped from the funnel portion into the take-out tube so as to be taken out. The suction by the take-out tube may be performed in any manners, but for example, a hole for suction is knocked in a middle portion of the take-out tube, and suction may be performed on this hole by a motor for suction.

As one form of the suction, the thin parts may be sucked from the upper end opening of the take-out tube by the receiving opening which faces the discharge opening (claim 9). As a result, the waterproof rubber can be led to the discharge opening of the take-out tube more securely and quickly. The waterproof rubber is received by the receiving opening more securely.

Further, the take-out tube inserted into the feeding opening of the funnel portion reciprocates relatively so as to be taken into and out from the funnel portion, and the upper end opening is repeatedly protruded from the feeding opening into the funnel portion. The relative reciprocating motion may be such that the take-out tube reciprocates with respect to the still funnel portion, and on the contrary, the funnel portion reciprocates with respect to the still take-out tube. Further, both of them may move simultaneously. As a result, even in the case where the thin parts are jammed at the opening at a bottom of the funnel portion (a tapered bottom portion of the funnel portion), or the thin parts make an arch with them covering the opening and are jammed, and as a result the thin parts in the funnel portion do not descend to the bottom of the funnel portion (therefore, the thin parts do not enter the take-out tube), the jamming can be relieved by the take-out tube (claim 10).

Further, an agitating unit that agitates the thin parts in the funnel portion may be provided. As a result, the thin parts in the funnel portion are easily fed to the bottom of the funnel portion, and the taking-out into the take-out tube is improved. Even when the thin parts are jammed in the funnel portion, this can be relieved, and thus the thin parts can be taken out into the take-out tube smoothly (claim 11).

An agitating unit that emits air into the funnel portion may be provided. The thin parts are agitated by air so that the feeding of the thin parts to the upper end opening of the take-out tube is improved, and when the thin parts are jammed in the funnel portion, this state is relieved (claim 12).

A blade portion may be disposed on an inner surface of the funnel portion, and an agitating unit that rotates the funnel portion in a slanted state may be provided. As a result, the thin parts placed on the blade portion drop when the blade portion is posited in an upper part by the rotation of the funnel portion, so that the thin parts in the funnel portion are agitated (claim 13).

An agitating arm that agitates the inside of the funnel portion may be used as the agitating unit. The agitating arm directly agitates the thin parts (claim 14).

Respective components may be exchangeable so that they are compatible with different shapes and sizes of the thin parts. The feeding device may be provided with the funnel portion, the take-out tube, and the receiving portion so that they are arbitrarily exchangeable. Further, the feeding device may be provided with the posture correcting portion, the delivery portion, and the transporting portion so that they are arbitrarily exchangeable (claims 15 and 17).

A presence/non-presence sensor that detects whether the thin parts are present in a storage opening selected from respective storage openings including the receiving opening, the transporting opening, the rotational moving opening, and the delivery opening is provided. As a result, reception post that the thin parts are received properly by the storage opening and a delivery post that the received thin parts are delivered properly to a next step can be acquired, so that the reception and delivery conditions of the thin parts at the respective steps can be known (claim 18).

For example, completion of the delivery which means that the delivered thin parts are received by a destination side can be checked by confronting the delivery post with the reception post, and when the delivery is performed properly, the reception by the destination side must be performed properly (claim 19).

When the delivery post and the reception post are used for opportunity of a next step, the respective components can be controlled easily (claim 20).

According to the present invention, since the thin parts can be taken out one by one from the funnel portion for feeding the thin parts, the feeding device can be downsized. Further, since the thin parts are taken out by the take-out tube or the like, the constitution can be simplified. Due to the feeding device according to the present invention, contact between the thin parts and apparatus is reduced, so that contamination of the waterproof rubber or the like due to oil or the like can be eliminated easily. Further, the thin parts are taken out by suction, so that they can be fed quickly.

BRIEF DESCRIPTION OF THE DRAWINGS

FIG. 14 is a diagram illustrating the waterproof rubber as the thin part; and

FIG. 15 is a diagram illustrating a conventional thin-part feeding device.

DETAILED DESCRIPTION OF EXEMPLARY EMBODIMENTS

Details of a thin-part feeding device of the present invention are explained below with reference to the drawings, but the thin-part feeding device of the present invention is not limited to the following embodiments.

First Illustrative Embodiment

An embodiment of the feeding device 100 according to the present invention is explained below.

Figure 1:
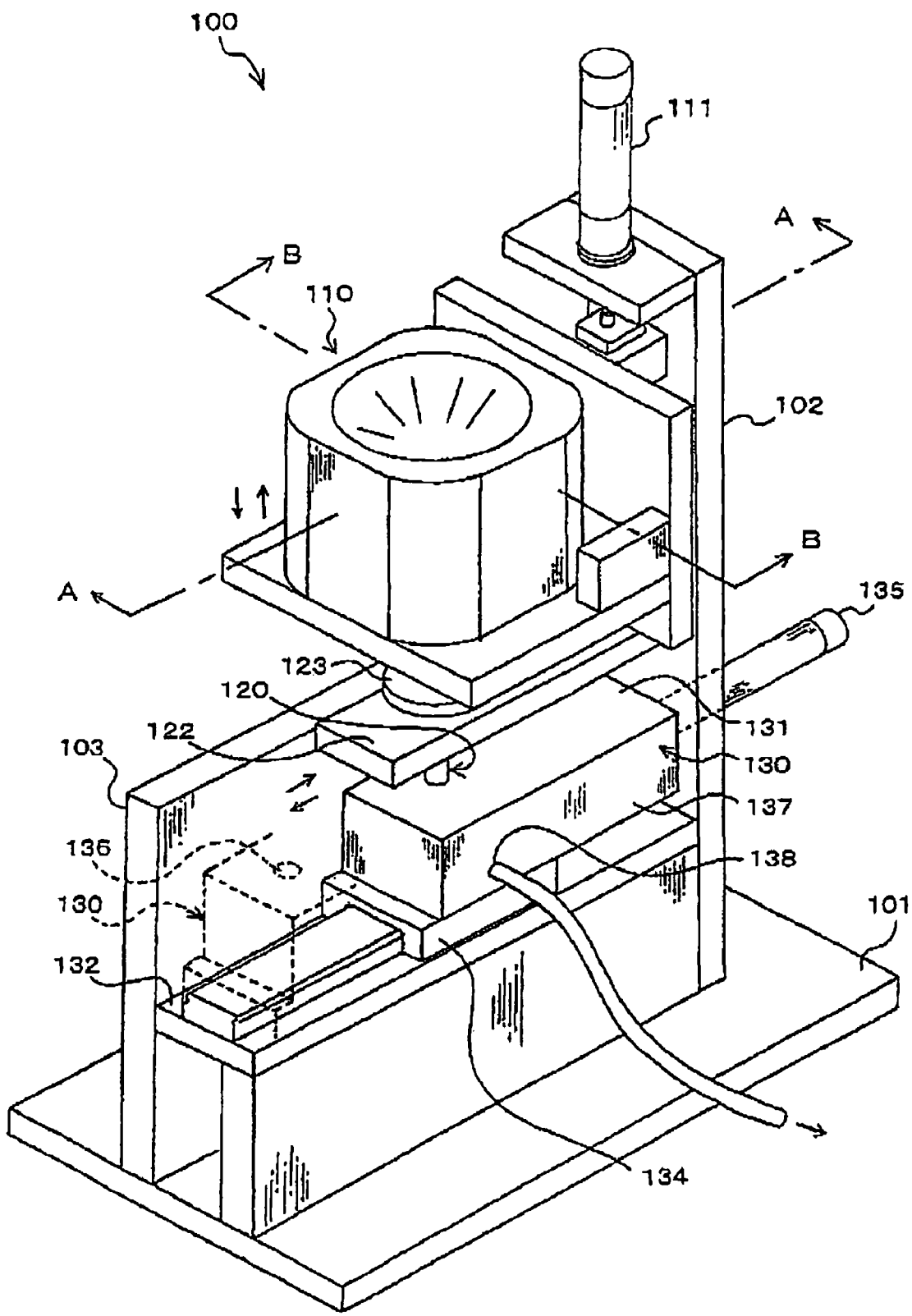
FIG. 1 is a perspective view illustrating a thin-part feeding device 100 according to a first embodiment.
Figure 2:
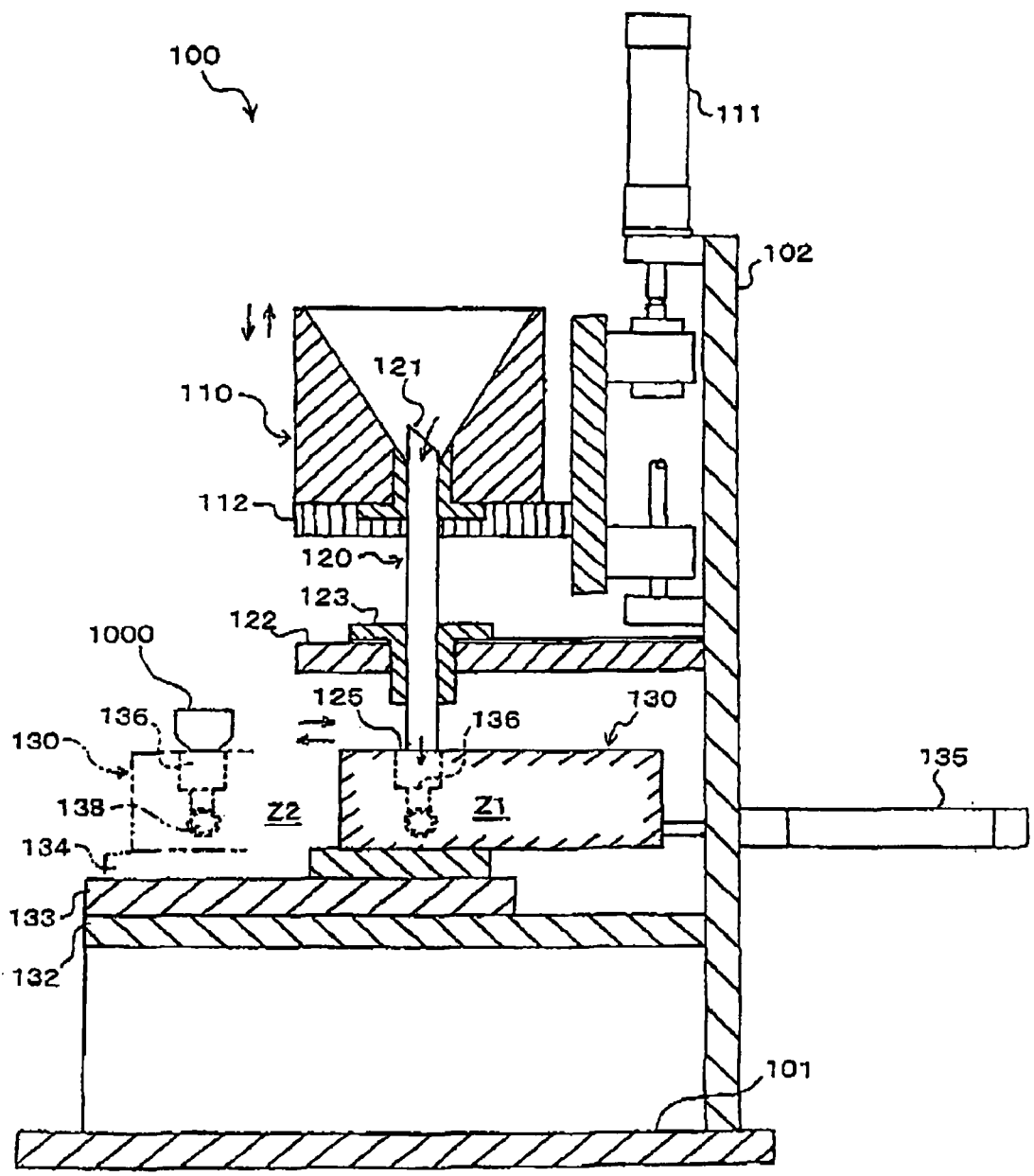
FIG. 2 is a diagram explaining a summary of a cross section A-A of a feeding device 300.
Figure 3:
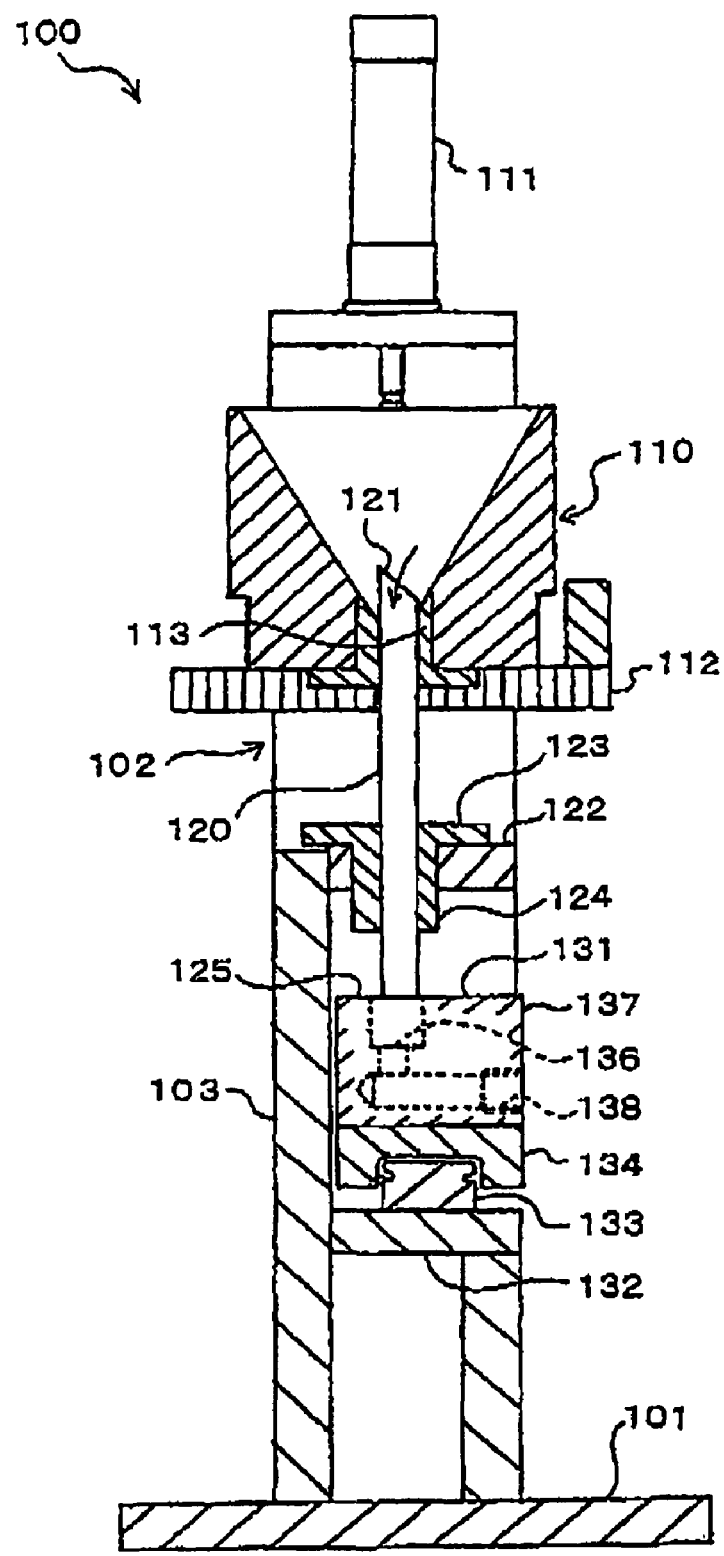
FIG. 3 is a diagram for explaining a summary of a cross section B-B of the feeding device 300.

The feeding device 100 is, as shown in FIGS. 1 to 3, constituted so that a first supporting wall 102 and a second supporting wall 103 which are installed upright on an approximately horizontal substrate 101 are disposed at right angles in plan view. A funnel portion 110 into which waterproof rubber is inserted, a take-out tube 120 that takes out the waterproof rubber from the funnel portion 110, and a receiving portion 103 having a receiving opening 131 for the waterproof rubber coming out from the take-out tube 120 are disposed in this order from top to bottom, and they are supported to predetermined positions of the first supporting wall 102 and the second supporting wall 103).

Figure 4:
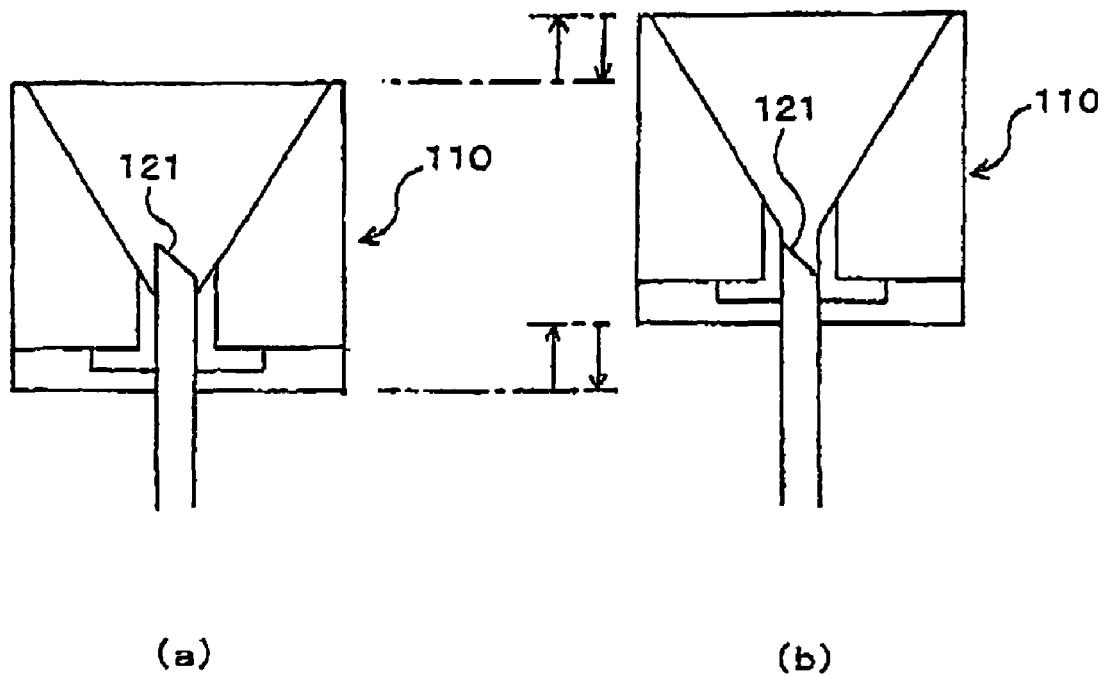
FIGS. 4 are diagrams explaining a up-down reciprocating motion of a funnel section.
Figure 10:
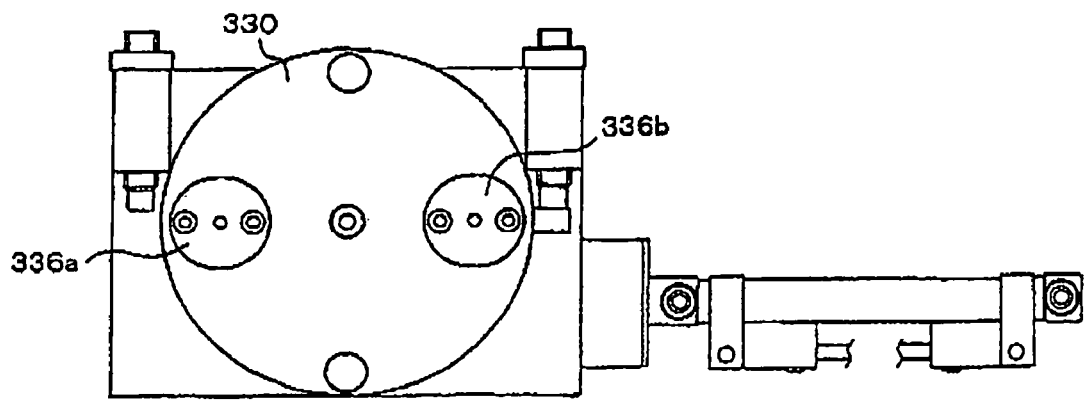
FIG. 10 is a top view illustrating a disc-shaped first storage section.

That is to say, the thin-part feeding device 100 has an elevating cylinder 111 disposed at a top portion of the first supporting wall 102, a platform 112 which is ascended and descended by the elevating cylinder 111, and the funnel portion 110 disposed on the platform 112. The funnel portion 110 is repeatedly reciprocated in a vertical direction by the platform 112, and as shown in FIG. 10, an upper end opening 121 of the take-out tube 120 is positioned in an inside of a cylinder opening at the top of the reciprocating motion (FIG. 4(a)), and it is projected to the inside of the funnel portion at the bottom of the reciprocating motion (FIG. 4(b)).

The feeding device 100 has a holder adapter plate 122 which is mounted to the first supporting wall 102 and the second supporting wall 103 in a horizontal manner, and a disc-shaped holder 123 which is disposed on the holder adapter plate 122. The take-out tube 120 is inserted vertically into a cylinder portion 124 which is installed upright on the center of the holder plate. The take-out tube 120 has a thickness which enables waterproof rubber to pass therethrough, and the upper end opening 121 has a slant cut edge. This is because waterproof rubber is easily led to the upper opening 121 due to the slant cut edge. The take-out tube 120 is arranged in a state where the upper end opening 121 is inserted into the cylinder opening 113 of the funnel portion 110 from below, and its longitudinal center is supported by the holder 123. A discharge opening 125 at a lower end of the take-out tube 120 is arranged on an upper surface portion 131 of the receiving portion 130, mentioned next, so as to be proximity to the upper surface portion 131 with a slight gap.

Further, in the feeding device 100, a horizontal rail 133 is provided onto a rail pedestal 132 provided in a position higher by one step than the substrate 46, and the receiving portion 130 having a leg portion 134 is disposed so as to be capable of being moved along the horizontal rail 133 by a horizontal cylinder 135 provided to the first supporting wall 102. The receiving portion 130 is an approximately rectangular solid, and the upper surface portion 131 is made to be proximity to the discharge opening 125 of the take-out tube 120 from below, to cover the discharge opening 125 of the take-out tube 120 from below. The receiving portion 130 on the horizontal rail 133 is reciprocated to the horizontal direction by the horizontal cylinder 135. A receiving opening 136 having a size and a shape for enabling one piece of the waterproof rubber to be stored is recessed on the upper surface portion, and receives to store the waterproof rubber taken out from the discharge opening 125 of the take-out tube 120. As shown in FIG. 2, when the receiving portion 130 is positioned on one end side Z1 of the reciprocating motion, the receiving opening 136 is arranged so as to come just below the discharge opening 125, and when the receiving portion 130 moves to the other end side Z2, the receiving opening 136 deviates from the discharge opening 125. When the receiving opening 136 deviates from the discharge opening 125, the waterproof rubber stored in the receiving opening 136 is brought into a take-out enabled state. A pumping hole 138 which is connected to a bottom portion of the receiving opening 136 is disposed on a side surface 137 of the receiving portion 130, and suction and exhaust are carried out through the receiving opening 136 by a suction/exhaust pump, not shown. Concretely, when the receiving portion 130 is at the one end side Z1, suction is carried out, and when the receiving portion 130 is at the other end side Z2, the exhaust is carried out.

A use method for the thin-part feeding device is explained below. A preparation is made in such a manner that many pieces of waterproof rubber are put into the funnel portion 110. When a starting switch, not shown, is ON in this state, the suction/exhaust pump is actuated so that suction and exhaust are started at the receiving opening 136. Simultaneously, the horizontal reciprocating motion of the receiving portion 130 and the vertical reciprocating motion of the funnel portion 110 start.

When the receiving portion 130 comes to the one end size Z1 of the reciprocating motion, suction is carried out at the receiving opening 136, but since the receiving opening 136 is made to face the discharge opening 125 at the one end side Z1, suction is carried out at the discharge opening 125, and as a result, the upper end opening 121 of the take-out tube 120 inserted into the funnel portion 110 sucks the waterproof rubber. The sucked waterproof rubber is discharged from the discharge opening 125, and is sucked by the receiving opening 136 of the receiving portion 130, so that only one piece of the waterproof rubber is stored in the receiving opening 136. The receiving portion 130 which receives the waterproof rubber moves to the other end side Z2, and is delivered to a next step. In this embodiment, when the discharge opening 125 of receiving opening 136 deviates from the discharge opening 125, an take-out portion 1000 on the outside of the device is made to face the receiving opening 136 instead. The take-out portion 1000 on the outside of the device sucks and takes out the waterproof rubber on the receiving opening 136, and at this time, the receiving opening 136 delivers the waterproof rubber by means of exhaust and the take-out portion 1000 sucks the waterproof rubber so as to receive it securely. The waterproof rubber taken out through the take-out portion 1000 on the outside of the device is delivered directly to a next step, not shown. The receiving portion 130 where the receiving opening 136 gets empty is again moved to the one end side Z1, and the same motion is repeated so that the waterproof rubber on the funnel portion 110 is fed one by one to the next step.

The waterproof rubber at the bottom portion of the funnel portion is taken out, and thus the waterproof rubber in the funnel portion gradually descends to the bottom portion so as to be sucked sequentially. Even when the waterproof rubber on the bottom portion is taken out, the other pieces of waterproof rubber around the taken-out waterproof rubber are occasionally jammed and do not descend to the bottom portion. For example, water proof rubber is jammed at the bottom portion in an arch pattern, and it is not occasionally sucked by the take-out tube. Even in such a case, with the feeding device of this embodiment, the funnel portion ascends and descends so that the jamming at the take-out tube can be relieved, so that the feeding of the waterproof rubber is continued with no difficulty.

In the above case, when the thin parts in the funnel portion are agitated by an agitating unit, the portion where the waterproof rubber is jammed can be broken, so that the suction disabled state can be avoided.

In this feeding device, an attention is not paid to a vertical posture of thin parts, and thus this device is suitable for thin parts without discrimination between their top and bottom.

Figure 5:
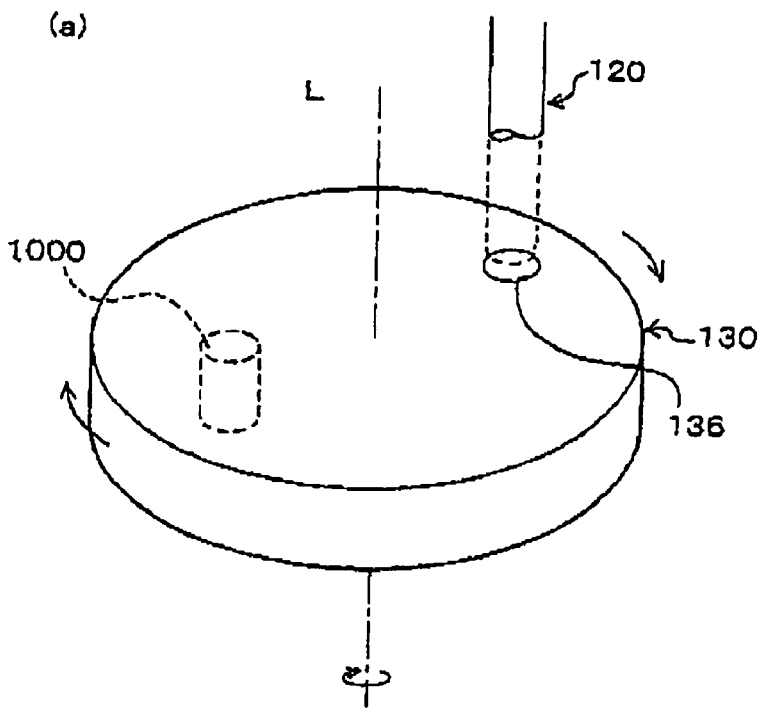
FIGS. 5 are explanatory diagrams illustrating a receiving portion according to different embodiments.
Figure 5:
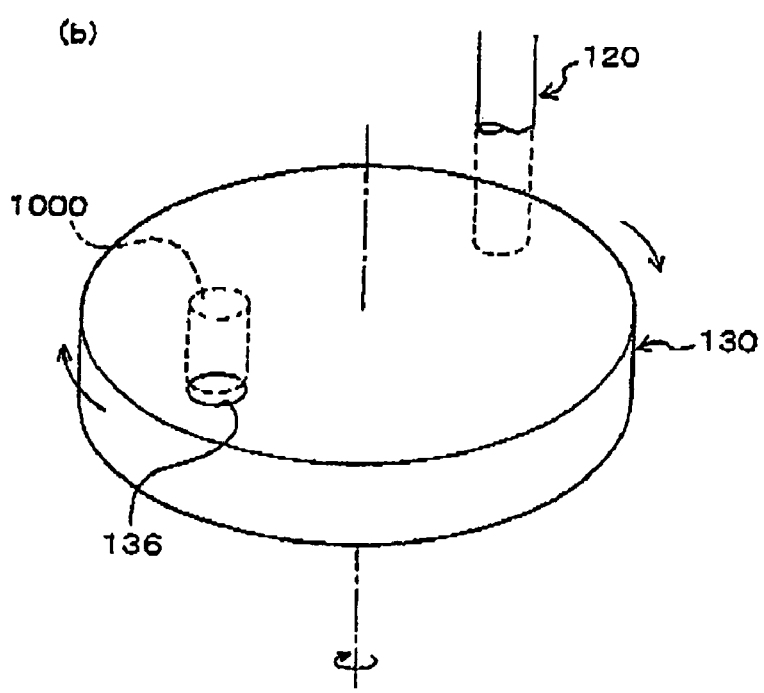
Figure 6:
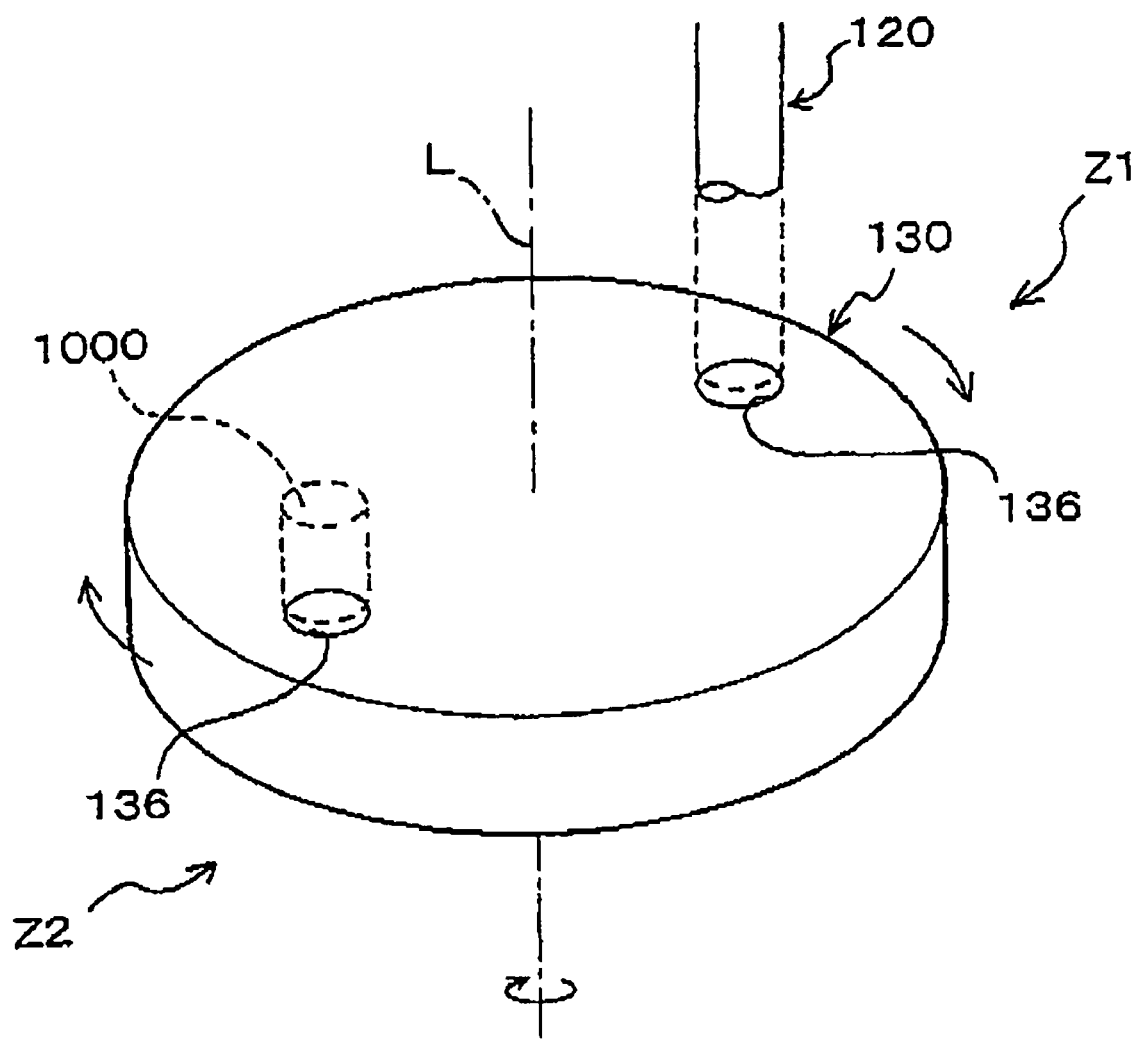
FIG. 6 is an explanatory diagram illustrating the receiving portion according to another embodiment.

The receiving portion is not limited to ones which make the above-mentioned reciprocating motion, and any kinds of the receiving portions may be used as long as they are within the scope of the present invention. For example as shown in FIG. 5, the disc-shaped receiving portion 130 may rotate intermittently each 180 degrees through a vertical rotating axis L. In this case, the receiving portion 130 rotates while it stops in positions of the take-out tube 120 and the take-out portion 1000 on the outside of the device, and the thin parts may be received and delivered to a next step in the respective stop positions. In another manner, as shown in FIG. 6, two receiving openings 136 and 136 may be provided so as to be symmetrical with respect to the rotating axis L. As a result, while thin parts discharged from the take-out tube 120 are stored in the receiving opening 136 at the one end side Z1, thin parts which are previously stored can be delivered from the receiving opening 136 at the other end side Z2 can be delivered to the receiving portion 1000 on the outside of the device, so that the processing speed is doubled.

For example, the feeding device 200 in the following second embodiment 2 may be used.

Second Illustrative Embodiment

Figure 7:
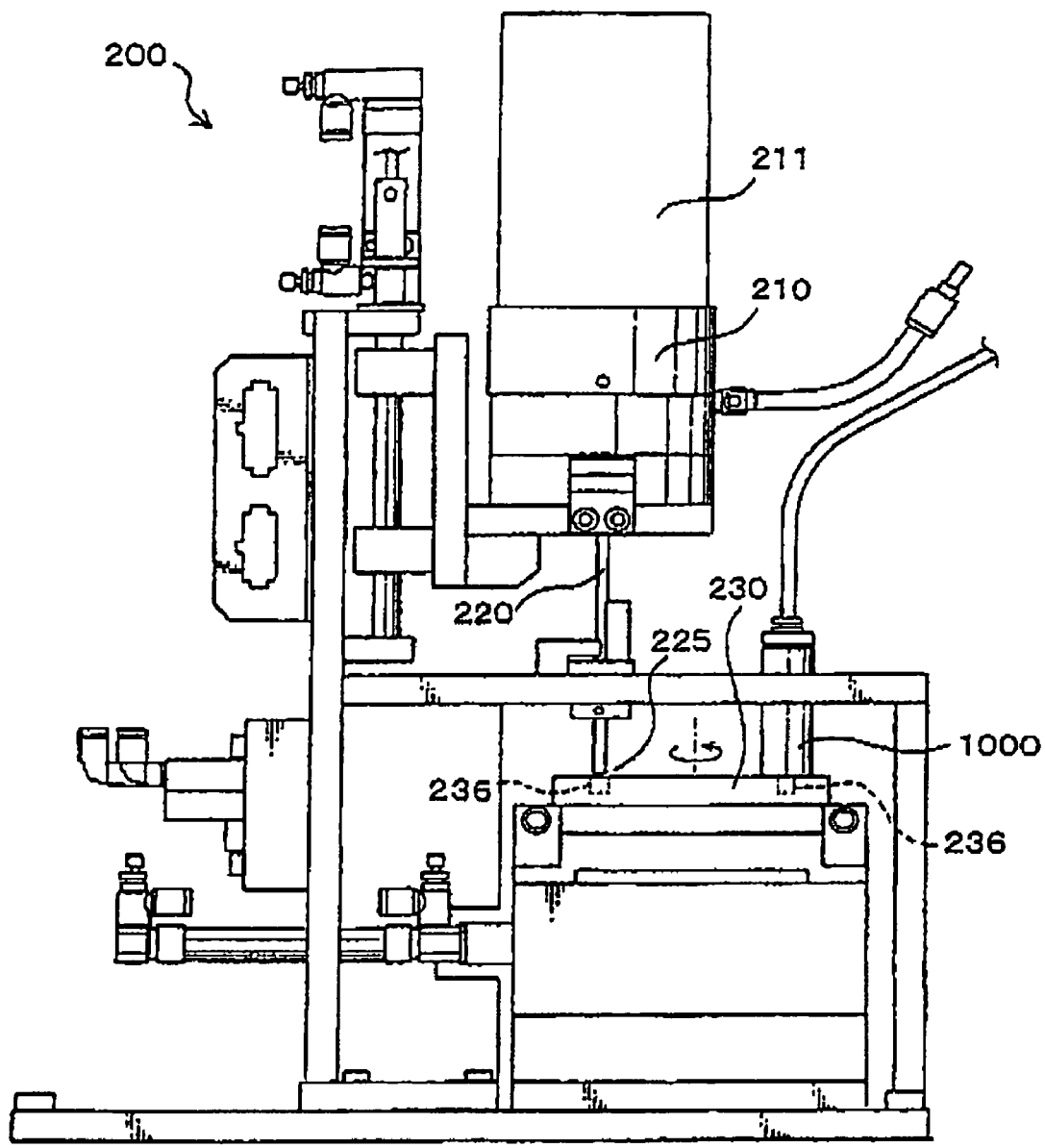
FIG. 7 is a side view illustrating a thin-part feeding device 200 according to a second embodiment.

The feeding device 200 of the second embodiment is constituted, as shown in the side view of FIG. 7, so that a cylinder body 211 is placed on an upper portion of the funnel portion 210 to which waterproof rubber (thin parts) is fed. The take-out tube 220 which takes out waterproof rubber (thin parts) from the funnel portion 210, and the receiving portion 230 which receives the waterproof rubber taken out from the take-out tube 220 are arranged in this order from top to bottom. The receiving portion 230 is exchangeable and has a disc shape, and two receiving opening 236 are disposed on a periphery of the disc shape so as to be spaced with a gap of half periphery, and when the receiving openings 236 are made to face the discharge opening at the lower end of the take-out tube and the discharge opening is located at the receiving portion 230, the thin parts and are stored therein, the receiving portion 230 rotates by 180 degrees and deviates from the discharge opening so that the thin parts can be taken out. At the same time, the other empty receiving opening 236 moves to the position of the discharge opening 225 so as to be made to face the discharge opening 225.

When the receiving portion 230 receives the thin parts (waterproof rubber), a vacuum sensor provided below the receiving portion 230 senses presence of the thin parts, and the receiving portion 230 rotates by 180 degrees so that the thin parts (waterproof rubber) of the receiving portion 230 are delivered to the take-out portion 1000 for feeding them to the outside of the device. The feeding device 200 of this embodiment is also suitable for the case where the thin parts (waterproof rubber) without discrimination between its top and bottom are fed.

Third Illustrative Embodiment

The thin-part feeding device 300 according to an embodiment of the present invention that feeds waterproof rubber as thin parts are explained below.

Figure 8:
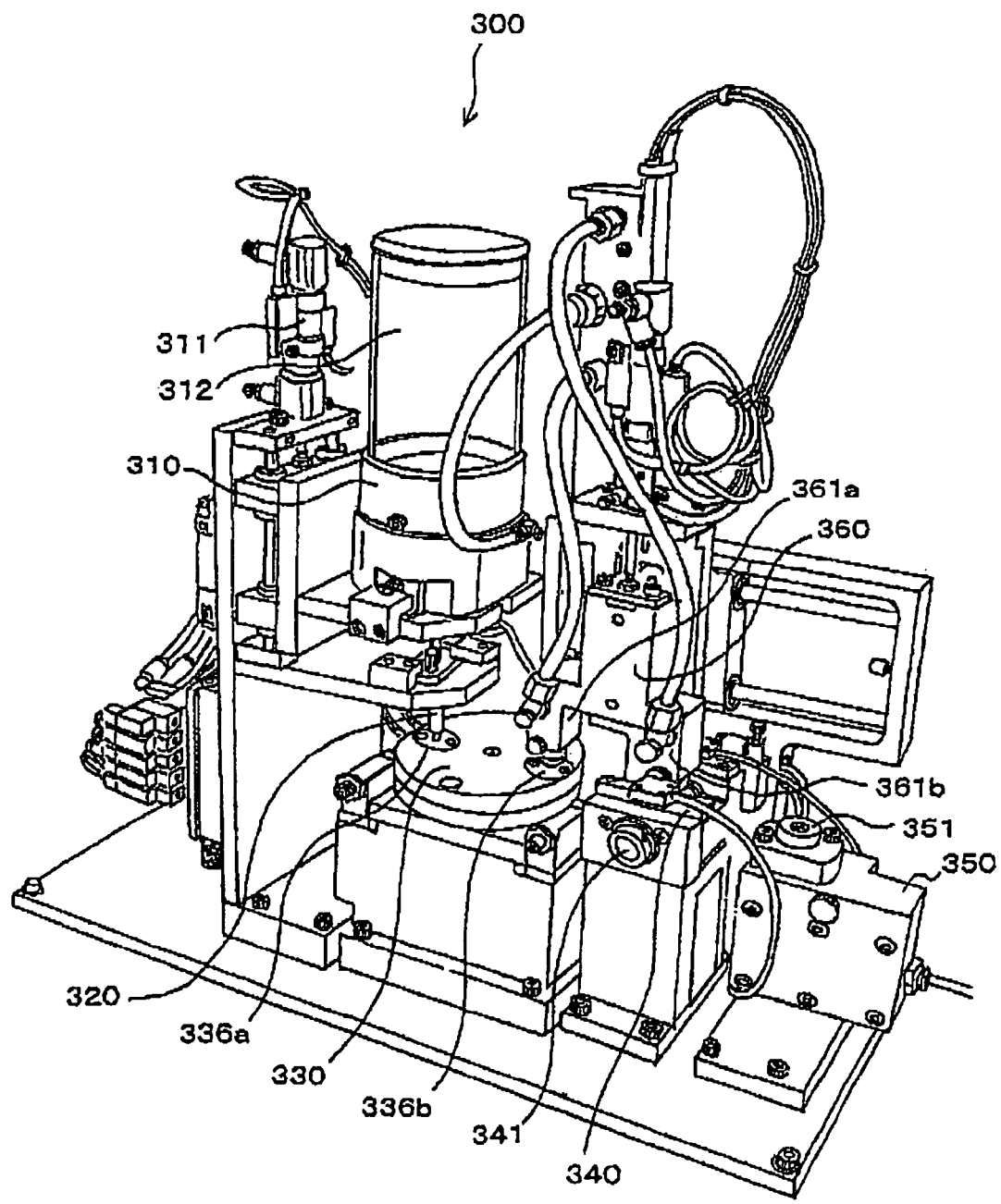
FIG. 8 is a perspective view illustrating the thin-part feeding device 300 according to a third embodiment.
Figure 9:
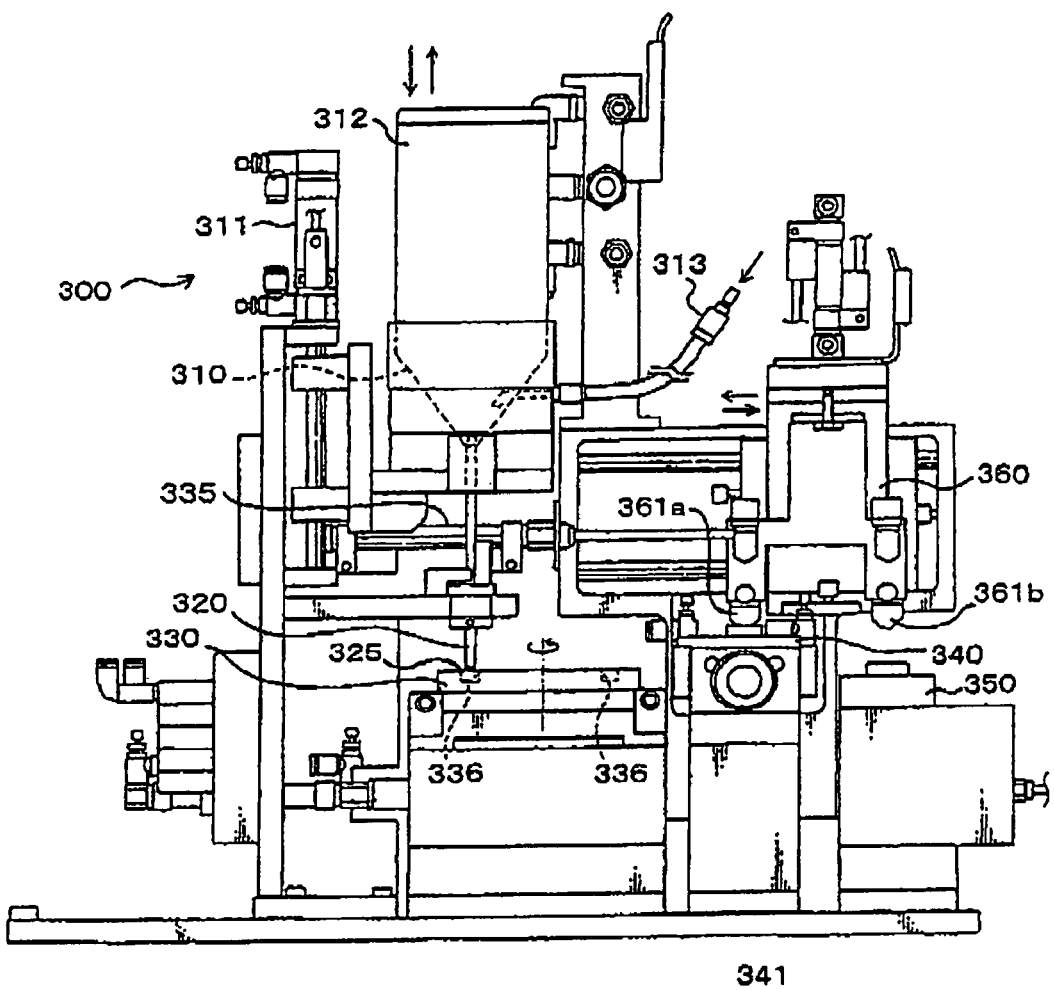
FIG. 9 is a schematic diagram of the feeding device 100 of FIG. 8 viewed from a side.

The thin-part feeding device 300 is, as shown in a perspective view of FIG. 8 and a side view of FIG. 9, provided with the cylinder body 312 into which waterproof rubber (thin parts) are put, the funnel portion 310 which is provided to the bottom portion of the cylinder body, the take-out tube 320 which is disposed in the state where it is inserted into a feeding opening at the bottom portion of the funnel portion 310 from below, and the receiving portion 330 having the receiving openings 326a and 326b which receives thin parts take out from the discharge opening 235 at the lower end of the take-out tube 320 in this order from top. The funnel portion 310 repeatedly wiggles up and down by the elevating cylinder 311.

The feeding device 300 is further provided with a posture correcting portion 340 that is lined up in single file with the receiving portion 330 and corrects a vertical posture of thin parts transported from the receiving portion 330, and a delivery portion 350 that delivers the thin parts transported from the posture correcting portion 340 to the outside of the device.

Further, a transporting portion 360 that transports the thin parts to the receiving portion 330, the posture correcting portion 340 and the delivery portion 350 in this order is disposed so as to be capable of moving horizontally along single file above the receiving portion 330, the posture correcting portion 340 and the delivery portion 350 which are lined up in single file. The transporting portion 360 is, as shown in FIG. 9, capable of moving to a horizontal direction by means of the horizontal cylinder 335.

The funnel portion 310 and the take-out tube 320 which is inserted into the funnel portion 310 from above have the approximately same constitutions as those in the first and the second embodiments. An air tube 313 is inserted into the funnel portion 310 from side, and an end of the air tube 313 intermittently ejects compressed air to the bottom portion of the funnel in the funnel, and as a result, the waterproof rubber near the bottom portion is agitated.

The receiving portion 330 has a disc shape and is capable of moving rotationally to the horizontal direction as shown in a top view of FIG. 10. The receiving portion 330 is provided with the two receiving openings 336a and 336b so that they are spaced with a gap of half periphery. When the receiving opening 336 is brought to a position where it faces the discharge opening and the receiving opening 336b is brought to a position closer to the posture correcting portion 340, and the receiving portion 330 moves rotationally intermittently by every half periphery, the positions of the two receiving openings 336a and 336b on the periphery switch alternately. When the thin parts are fed from the take-out tube 320 to the receiving opening 336a, a vacuum sensor (not shown) as a presence/non-presence sensor provided below the receiving opening 336a detects presence/non-presence of the thin parts in the receiving opening 336a. When the vacuum sensor detects the presence of the thin parts in the receiving opening 336a, the disc-shaped receiving portion 330 moves rotationally by half periphery, and the thin parts in the receiving opening 336a moves to the posture correcting portion 340. In this embodiment, the disc-shaped receiving portion 330 which is capable of moving rotationally has the two receiving openings 336a and 336b, but the number of the receiving openings is not particularly limited to two as long as the receiving portion 330 are rotated and the thin parts are fed efficiently. For example, four receiving openings may be provided with constant gaps, and the receiving portion 330 may be moved rotationally by each ¼ periphery, or more receiving openings may be provided.

The discharge opening 325 of take-out tube 320 and the upper surface of the receiving portion extremely are placed close to each other. They are placed close to each other because when their gap is wide, waterproof rubber occasionally drops out of the wide gap. The other reasons are as follows. That is to say, some pieces of waterproof rubber are small cylinders, and when openings at both the ends of the cylinder have different sizes, a smaller opening of waterproof rubber is inserted into a larger opening of another waterproof rubber, namely, two pieces of the waterproof rubber which are connected to each other are infrequently fed from the take-out tube 320. For this reason, the connected waterproof rubber is jammed by the slight gap between the discharge opening 325 of the take-out tube 320 and the receiving opening 336a or 336b, and when the receiving portion 330 rotates, the connection of the waterproof rubber is released by rubbing it.

Figure 11:
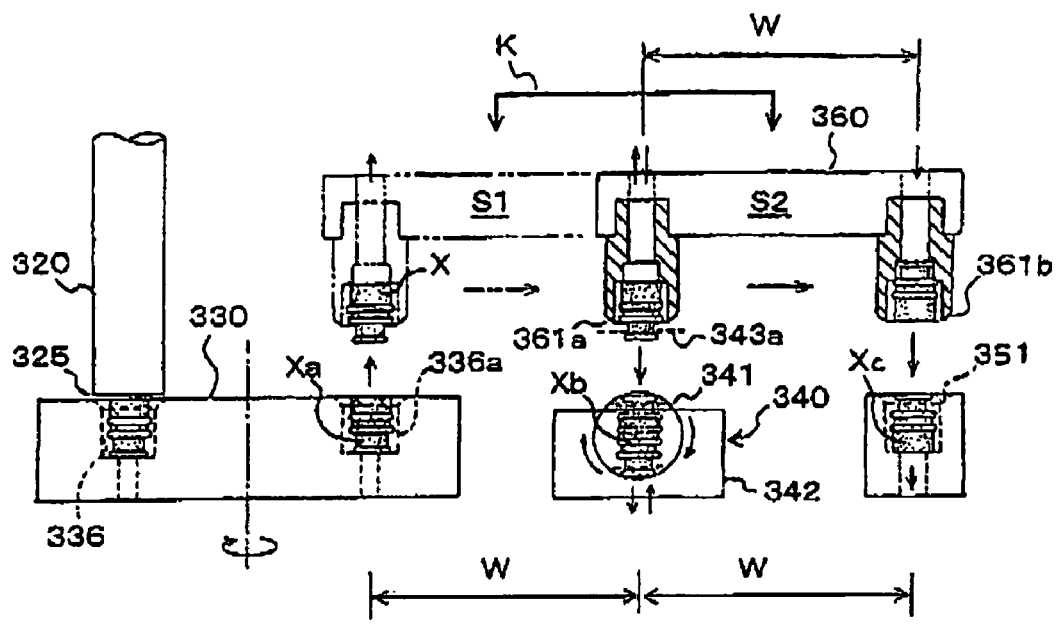
FIG. 11 is a diagram explaining an action of a transfer section.

As shown in FIG. 11, the transportation portion is provided with two transporting openings 361a and 361b so as to face down. The receiving opening 336b, a rotational moving opening 341 of the posture correcting portion 340 and a delivery opening 351 of the delivery portion 350 are lined up in single file at equal gap so as to face up, and the two transporting openings 361a and 361b of the transporting portion 360 are provided above the single file so as to line up in single file. Further, the transporting portion 360 reciprocate to a horizontal direction which is the same as that of the single file, and concretely, the transporting portion 360 can ascend and descend, and move horizontally as shown by an arrow K of FIG. 11.

The receiving opening 336b, the rotational moving opening 341, and the delivery opening 351 are arranged with equal gap W, but two transporting openings 361a and 361b of the transporting portion are also arranged with the same gap W. The horizontal motion means the reciprocating motion by the gap W. In other words, the transporting portion reciprocates horizontally in positions S1 and S2 in FIG. 11. When the transporting portion 360 is in the position S1, the two transporting openings 361a and 361b come to just above the receiving opening 336b and the rotational moving opening 341, and when the transporting portion 360 descends therefrom, two pieces of waterproof rubber Xa and Xb stored in the receiving opening 336b and the rotational moving opening 341 can be received simultaneously. When the transporting portion 360 is in the position S2, the two transporting openings 361a and 361b come to just above the rotational moving opening 341 and the delivery opening 351, and when the transporting portion 360 descends therefrom, the two pieces of waterproof rubber Xb and Xc in the transporting openings 361a and 361b can be delivered simultaneously to the rotational moving opening 341 and the delivery opening 351. The posture correcting portion 340 is installed securely below the transporting portion 360 so as to face the transporting opening 361a of the transporting portion 360, and as shown in FIG. 11, a hole of the vertical direction which can store the waterproof rubber Xb is provided to a lateral pillar so as to be the rotational moving opening 341. The posture correcting portion 340 has a support medium 342 that supports the rotational moving opening 341 so that the rotational moving opening 341 can move rotationally. That is to say, the rotational moving opening 341 and the support medium 342 establish a relationship between a shaft and a bearing.

Figure 12:
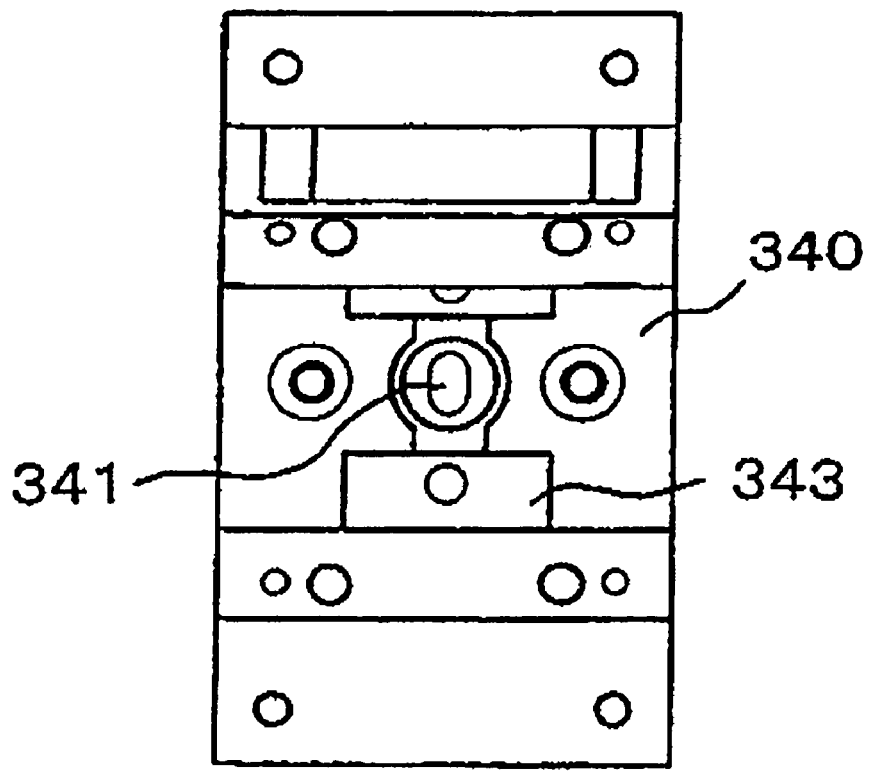
FIG. 12 is a top view illustrating a second storage section.

As shown in FIG. 12, an optical sensor 343 as a posture detecting unit is disposed near the rotational moving opening 341 on the upper surface of the posture correcting portion 340. The optical sensor 343 detects a vicinity of the transporting opening 361a descending towards the rotational moving opening 341, and detects a protruded condition of the waterproof rubber X stored in the transporting opening 361a so as to detect the vertical posture of the waterproof rubber.

The posture correcting portion 360 rotates the waterproof rubber Xb in the rotational moving opening 341 by 180 degrees if necessary based on the post from the optical sensor 343, and inverts the posture of turned waterproof rubber Xb so as to correct the posture into an upward posture. Needless to say, when the detected posture of the transported waterproof rubber Xb is the upward posture which does not have to be corrected, the waterproof rubber Xb which is delivered to the posture correcting portion 340 is returned directly to the transporting opening 361a in this posture.

The rotational motion of the rotational moving opening is not limited to a 180 degree motion, and the motion is not particularly limited to the rotational motion as long as the thin parts are made to face a poorer direction. The posture detecting unit may be attached to be installed near the transporting opening 361 a of the transporting portion 360. Also when the transporting portion 361a sucks waterproof rubber from the rotational moving opening 341 of the posture correcting portion 340, the posture detecting unit may again detect to check whether the waterproof rubber face the proper direction if necessary.

The posture detecting unit for waterproof rubber is explained. A suction opening of the transporting opening 361a of the transporting portion 360 becomes thick according to a thick portion of the waterproof rubber, and its inward portion becomes thinner according to a thin portion of the waterproof rubber. For this reason, when waterproof rubber having a thin portion is sucked properly, the thin portion is fixed to the thin portion of the transporting opening 361a and the thick portion is housed in the transporting opening. When the waterproof rubber enters the transporting opening 361a with the thick portion first, therefore, the thin portion protrudes from the transporting opening 361a so that the posture detecting unit detects it. A broken line 343a of FIG. 11 means a summary of light emission for detection.

The delivery portion 350 delivers waterproof rubber to the outside of the device, and receives the waterproof rubber in the posture correcting portion 340 from the transporting portion 360 so as to feed the waterproof rubber from the delivery opening 351 to the outside of the device.

The receiving portion 330 is provided with the vacuum sensor as the presence/non-presence that detects whether the waterproof rubber is present in the receiving opening 336a when the receiving opening 336a comes to the discharge opening, and the two transporting openings 361a and 361b are provided with the similar presence/non-presence sensor. These sensors can acquire reception posts as to whether the waterproof rubber is received appropriately.

Figure 13:
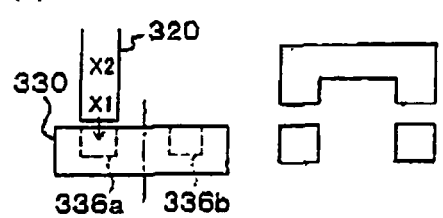
FIG. 13 are diagrams explaining transition in the action of the transfer section and motion of waterproof rubber.
Figure 13:
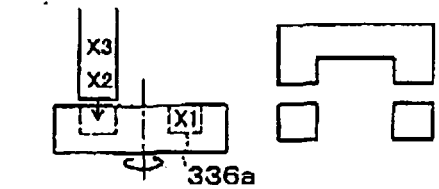
Figure 13:
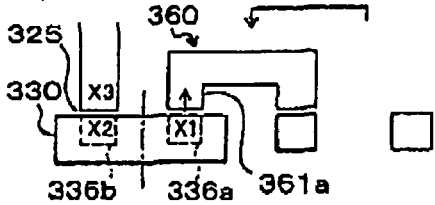
Figure 13:
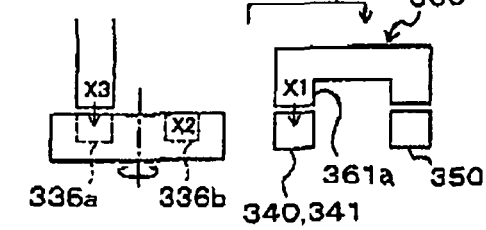
Figure 13:
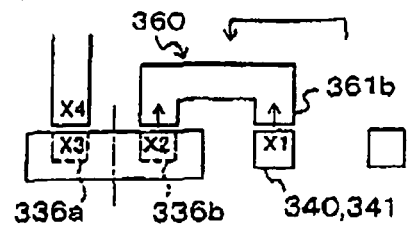
Figure 13:
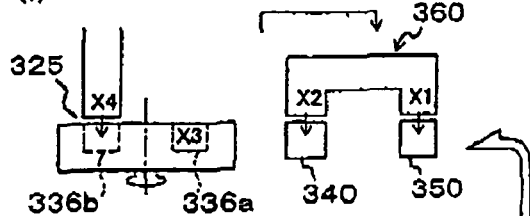
Figure 13:
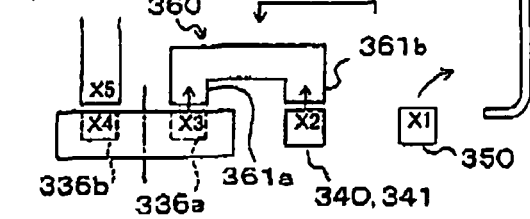

As shown in FIG. 13(a), the waterproof rubber feeding device 300 feeds first waterproof rubber X1 from the funnel portion 310 via the take-out tube 320 to the receiving opening 336a of the receiving portion 336. At this time, in the receiving portion 330, the receiving opening 336a below the take-out tube 320 is sucked from the lower portion of the receiving portion 330, and the vacuum sensor detects the sucked state so as to acquire a reception post that the waterproof rubber X1 enters the receiving opening 336a.

As shown in FIG. 13(b), according to the post, the receiving portion 330 half rotates so as to move toward the posture correcting portion 340. As shown in FIG. 13(c), the transporting opening 361a descends to the receiving opening 336a after the half-rotation, and ejection of the waterproof rubber X1 from the receiving opening 336a and suction at the transporting opening 361a are performed simultaneously. When the receiving portion 330 half rotates and the waterproof rubber X1 is moved just below the transporting opening 361a, the other empty receiving opening 336b comes below the discharge opening 325 so as to receive second waterproof rubber X2.

As shown in FIG. 13(d), when the transporting portion 360 ascends and horizontally moves above the posture correcting portion 340/the delivery portion 350, the transporting portion 360 descends toward the rotational moving opening 341 of the posture correcting portion 340. At this time, the optical sensor as the posture detecting unit detects the posture of the first waterproof rubber X1 in the transporting opening 361a. The first waterproof rubber is delivered to the rotational moving opening 341 of the posture correcting portion 340.

At the same time, the receiving portion 330 receives the second waterproof rubber X2, and the second waterproof rubber X2 is moved to a position for delivery from the posture correcting portion 340 by the half-rotation of the receiving portion 330. Further, the empty receiving opening 336a comes to the position of the discharge opening, so as to receive third waterproof rubber X3.

As shown in FIG. 13(e), the transporting portion 360 returns to the position above the receiving portion 330/the posture correcting portion 340. During this time, the posture of the first waterproof rubber X1 held by the posture correcting portion 340 is corrected as the need arises. The transporting portion 360 descends so as to receive the second waterproof rubber X2 from the receiving opening 336b and the first waterproof rubber X2 from the rotational moving opening 341 through the transporting openings 361a and 361b, respectively.

As shown in FIG. 13(f), the transporting portion 360 which receives the first and second rubber X1 and X2 moves horizontally to the position above the posture correcting portion 340/delivery portion 350, and the transporting portion 360 descends so as to deliver the first waterproof rubber X1 to the delivery portion 350 and the second waterproof rubber X2 to the posture correcting portion 340. During this time, the receiving portion 330 half rotates, and the third waterproof rubber X3 moves to a position for delivery from the posture correcting portion 340. Further, the empty receiving opening 336b comes to the position of the discharge opening 325, so as to receive the fourth waterproof rubber X4.

As shown in FIG. 13(g), the transporting portion 360 returns to the position above the receiving portion 330/the posture correcting portion 340. Similarly to the case of FIG. 13(e), during this time, the posture of the second waterproof rubber X2 held by the posture correcting portion 340 is corrected as the need arises, and the descended transporting portion 360 receives the third waterproof rubber X3 from the receiving opening 336a and the second waterproof rubber X2 from the rotational moving opening 341 through the transporting openings 361a and 361b, respectively. During this time, the first waterproof rubber X1 is delivered from the delivery portion 350 to the outside of the device.

Thereafter, the steps in FIGS. 13(f) and 13(g) are repeated only as the need arises.

What is claimed is:

1. A thin-part feeding device comprising:
   a funnel portion that has a feeding opening at a bottom portion of a funnel and feeds thin parts;
   a take-out tube that is arranged in the state that it is inserted into the feeding opening from below and takes out the thin parts from the funnel portion;
   a receiving portion that has a receiving opening that receives the thin parts discharged from a discharge opening at a lower end of the take-out tube;
   a posture correcting portion that corrects a vertical posture of the thin parts;
   a delivery portion that has a delivery opening for receiving the thin parts whose posture is corrected and delivers the thin parts to the outside of the device;
   a transporting portion that transports the thin parts from the receiving portion to the posture correcting portion and from the posture correcting portion to the delivery portion, wherein the transporting portion has a transporting opening that sucks to house the thin parts and can eject to deliver them, and moves to transport the thin parts in the state that they are housed in the transporting opening; and
   a posture detecting unit that detects the vertical posture of the thin parts stored in the transporting opening when the thin parts have the vertical posture,
   wherein the receiving portion is provided so as to be able to move in the state that an upper surface of the receiving portion covers the discharge opening, and the receiving opening is recessed on the upper surface so as to have a size for enabling only one thin part to be stored therein, thereby repeatedly bringing the receiving opening into the state that it faces the discharge opening and the state that it deviates from the discharge opening so that the thin part can be taken out therefrom, and wherein when the thin parts have differences between top portions and bottom portions, the posture detecting unit detects a protruded state of the thin parts stored in the transporting opening so as to detect the vertical posture.

2. The thin-part feeding device according to claim 1, wherein the posture correcting portion corrects the posture of the thin parts received from the transporting portion based on a post from the posture detecting unit.

3. The thin-part feeding device according to claim 2, wherein the posture correcting portion has a rotational moving opening that houses the thin parts so as to reverse the vertical posture.

* * * * *